(12) United States Patent
Liu

(10) Patent No.: US 6,905,722 B2
(45) Date of Patent: Jun. 14, 2005

(54) SPRAYABLE COOKWARE RELEASE COMPOSITION WITH REDUCED HEAT INDUCED BROWNING

(75) Inventor: Linsen Liu, Irvine, CA (US)

(73) Assignee: ConAgra Grocery Products Company, Irvine, CA (US)

(*) Notice: Subject to any disclaimer, the term of this patent is extended or adjusted under 35 U.S.C. 154(b) by 161 days.

(21) Appl. No.: 10/613,389

(22) Filed: Jul. 3, 2003

(65) Prior Publication Data

US 2005/0003065 A1 Jan. 6, 2005

(51) Int. Cl.$^7$ .............................. A23P 1/08; A23D 9/013
(52) U.S. Cl. ...................... 426/609; 426/662; 426/811; 554/80; 106/8; 106/9
(58) Field of Search ................................ 426/609, 662, 426/811; 554/80–83; 106/8, 9

(56) References Cited

U.S. PATENT DOCUMENTS

| | | |
|---|---|---|
| 2,796,363 A | 6/1957 | Lalone |
| 3,661,605 A | 5/1972 | Rubin et al. |
| 3,821,007 A | 6/1974 | Carey |
| 3,896,975 A | 7/1975 | Follmer |
| 4,023,912 A | 5/1977 | Mahler et al. |
| 4,066,817 A | 1/1978 | DeRossi |
| 4,073,411 A | 2/1978 | Doumani |
| 4,108,678 A | 8/1978 | Szuhaj et al. |
| 4,142,003 A | 2/1979 | Sejpal |
| 4,155,770 A | 5/1979 | Doumani |
| 4,163,676 A | 8/1979 | Konigsbacher |
| 4,188,412 A | 2/1980 | Sejpal |
| 4,192,898 A | 3/1980 | Hanson, Sr. |
| 4,371,451 A | 2/1983 | Scott et al. |
| 4,425,164 A | 1/1984 | Bliznak et al. |
| 4,479,977 A | 10/1984 | Dashiell et al. |
| 4,524,085 A | 6/1985 | Purves et al. |
| 4,528,201 A | 7/1985 | Purves |
| 4,547,388 A | 10/1985 | Strouss |
| 4,654,221 A | 3/1987 | Purves et al. |
| 4,849,019 A | 7/1989 | Yasukawa et al. |
| 5,156,876 A | 10/1992 | Clapp et al. |
| 5,211,317 A | 5/1993 | Diamond et al. |
| 5,296,021 A | 3/1994 | Clapp et al. |
| 5,362,892 A | 11/1994 | Umeda et al. |
| 5,370,732 A | 12/1994 | Follmer |
| 5,374,434 A | 12/1994 | Clapp et al. |
| 5,455,055 A | 10/1995 | Stoltz |
| 5,503,866 A | 4/1996 | Wilhelm |
| 5,567,456 A | 10/1996 | Clapp et al. |
| 5,650,185 A | 7/1997 | Stoltz |
| 5,662,956 A | 9/1997 | Knightly |
| 5,874,117 A | 2/1999 | Sundram et al. |
| 6,123,977 A | 9/2000 | Diamond |
| 6,210,743 B1 | 4/2001 | Clapp et al. |
| 6,365,211 B1 | 4/2002 | Corrigan |
| 6,365,558 B2 | 4/2002 | Lai |
| 6,403,144 B1 | 6/2002 | El-Khoury et al. |
| 6,414,172 B1 | 7/2002 | Garces et al. |

FOREIGN PATENT DOCUMENTS

| | | |
|---|---|---|
| EP | 0129290 A1 | 12/1984 |
| EP | 0591258 B1 | 9/1997 |
| EP | 0594258 B1 | 7/1999 |
| JP | 54-120607 | 9/1979 |
| JP | 60091939 A | 5/1985 |
| JP | 61-44120 | 10/1986 |
| JP | 01-262753 | 10/1989 |
| JP | 01-262754 | 10/1989 |
| JP | 4-283410 | 9/1992 |
| JP | 11-262358 | 9/1999 |
| JP | 2002-238453 | 8/2002 |

OTHER PUBLICATIONS

Swern, D. 1979. Bailey's Industrial Oil and Fat Products, vol. 1, 4th edition, John Wiley & Sons, New York, p. 293, 369, 429.*

"Nutritional Foods Spray the Fat"; Food Industries of South Africa, Sep. 1995; vol. 48, No. 9, P. 14.

T.P. Pantzaris; "Pocketbook of Palm Oil"; Malaysian Palm Oil Board, Ministry of Primary Industries, Malaysia; Fifth Edition, Sep. 2000; Tables 7, 11, 12, 15, 16 and 17 (3 pages).

R. Sono et al., "Heat Deterioration of Phospholipids," Journal of Olea Sciences, vol. 50, No. 11, pp. 905–911, Res. & Dev. Div., Tsuji Oil Mills Co. Ltd., Japan, 2001.

* cited by examiner

*Primary Examiner*—Carolyn Paden
(74) *Attorney, Agent, or Firm*—Bingham McCutchen LLP

(57) ABSTRACT

A sprayable cookware release composition includes an oil, a propellant, and a cookware release agent having lecithin treated with an alkali and a fatty acid at the same time or treated with a mixture of an alkali and a fatty acid. A variety of alkali and fatty acids can be used to treat the lecithin, including more than one alkali and more than one fatty acid. Suitable alkali for treating the lecithin include sodium and potassium sorbate, sodium and potassium carbonate, sodium and potassium bicarbonate, sodium and potassium acetate, sodium and potassium hydroxide, and mixtures thereof. Suitable fatty acids for treating the lecithin include oleic acid, linoleic acid, palmitic acid, stearic acid, and mixtures thereof. The cookware release agent and oil are mixed, and the mixture is dispensed from the aerosol container by the propellant. Suitable cookware release agents include lecithin and variants thereof, such as oil soluble lecithin, water-dispersible lecithin, hydroxylated lecithin, lyso-phopholipid, or a mixture thereof.

38 Claims, 1 Drawing Sheet

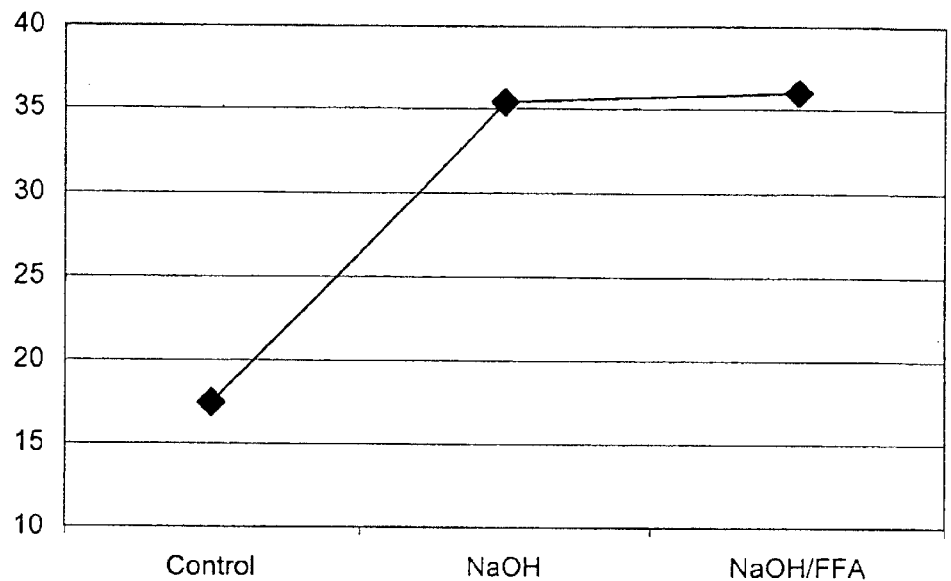
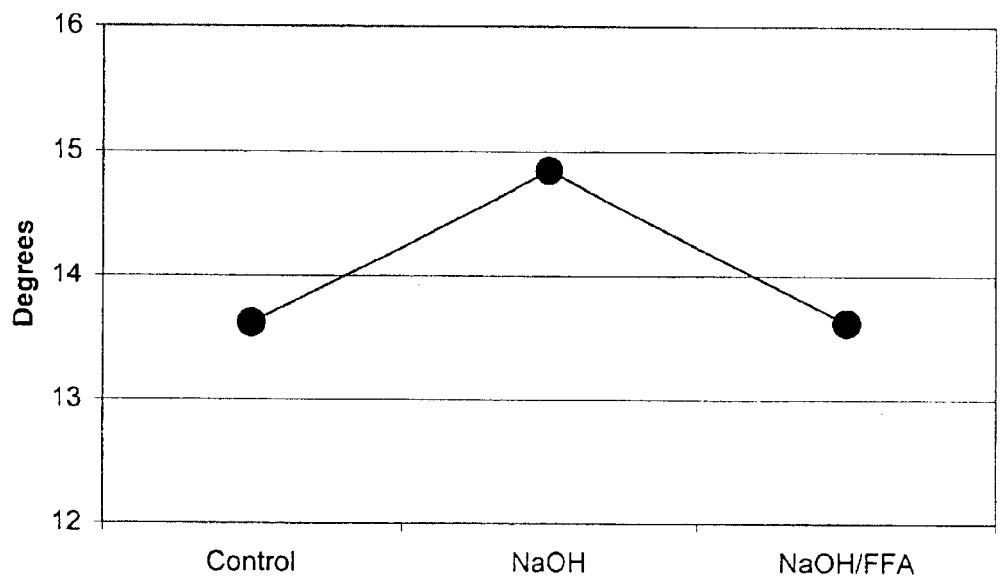

SPRAYABLE COOKWARE RELEASE COMPOSITION WITH REDUCED HEAT INDUCED BROWNING

FIELD OF THE INVENTION

The present invention relates to sprayable cooking compositions, and more particularly, to a sprayable cookware release composition containing a treated lecithin that serves as an anti-stick agent with reduced heat-induced browning.

BACKGROUND OF THE INVENTION

Various sprayable cookware release compositions have been developed to prevent cooking surfaces, utensils and other cooking implements from sticking to food items. For example, one conventional cooking spray includes a canola oil that is mixed with a release or anti-stick agent. The oil that is used in conventional cooking sprays is typically an unsaturated oil that contains significant quantities of unsaturated fatty acids, e.g., 85% or more by weight. The edible oil is used as a carrier medium, and a phospholipid functions as an anti-stick or release agent. A mixture of the oil and the release agent is dispensed by a propellant from an aerosol container, such as a gas or liquefied hydrocarbon pressurized container, or from a pump pressurized aerosol container. Other conventional cookware release compositions are in the form of a solid stick form of a lecithin, a common release or anti-stick agent. Conventional cooking sprays and anti-stick compositions, however, can be improved.

For example, when lecithin is heated to typical cooking temperatures, it has a tendency to darken or brown. Thus, while some cookware release compositions with lecithin may exhibit satisfactory release characteristics, the cooked food items can include a brownish coloring. This undesirable discoloring can result in the food item appearing less appetizing.

In order to reduce the browning of heated lecithin, other conventional cooking sprays include lecithin treated with acylation. For example, acylating lecithin by treatment with an organic anhydride such as acetic anhydride. Other conventional cooking sprays include hydroxylated lecithin. A conventional cooking oil includes lecithin treated with an alkali. For example, adding about 0.00005% by weight of a strong base to lecithin and heating the mixture to about 200° F. Both of these treated lecithins may exhibit less browning at cooking temperatures, however, the anti-stick or release abilities of these treated lecithins is typically impaired. Consequently, cooked food items may not release as well from cooking surfaces compared to untreated lecithin. As a result, a user may be required to scrape or force the food item from the cooking surface, thereby damaging the food item or the cooking surface. The food item is also more likely to be burned since it is not easily released from the heated cooking surface.

The problems discussed above can occur with both uncoated and coated cooking surfaces. Moreover, if a coated surface, such as a Teflon® surface, is repeatedly cleaned or scrubbed to remove a baked-on item, the cooking spray, or a burnt food product, the Teflon® coating can be scratched, thereby damaging or impairing the coated cookware. These shortcomings of conventional cooking sprays are amplified when food is cooked at higher temperatures or for longer periods of time since the degrees of browning, sticking, and burning effects typically increase with higher cooking temperatures and longer cooking times.

Another technique for attempting to address these shortcomings is to cook food items at lower temperatures or for shorter periods of time. These options, however, place restrictions on cooking food using conventional cooking sprays and can present a number of health hazards due to undercooked food. Consequently, the taste, quality and safety of food items cooked at lower temperatures can be impaired compared to cooking food items at typical higher cooking temperatures and longer durations.

A need, therefore, exists for a sprayable cookware composition that reduces or minimizes browning of the composition, while at the same time, providing satisfactory anti-stick or release characteristics. Reducing browning at typical cooking temperatures and durations can enable users to cook food at higher temperatures and for longer periods of time without impairing the appearance of the food item. A further need exists for a method of preparing a food item with such a composition or cooking spray.

SUMMARY OF THE INVENTION

The present invention provides a sprayable cookware release composition that can be dispensed from an aerosol container. The composition includes an oil, a propellant, and a cookware release agent containing lecithin treated with an alkali and a fatty acid at the same time. The lecithin can also be treated with a mixture of an alkali and a fatty acid. The cookware release agent is mixed with the oil. The mixture of the cookware release agent and oil is then dispensed from the aerosol container by the propellant.

Also in accordance with the present invention, the release agent can be any substantially anhydrous phospholipid, such as substantially anhydrous lecithin. Substantially anhydrous phopholipids contain no more than about 2.0% water (e.g. 1.0%–1.8%). The substantially anhydrous lecithin can also be a oil soluble lecithin, a water-dispersible lecithin, a hydroxylated lecithin, a lyso-phopholipid, or a mixture thereof. Further, a variety of alkali can be used to treat the lecithin, including sodium and potassium sorbate, sodium and potassium carbonate, sodium and potassium bicarbonate, sodium and potassium acetate, sodium and potassium hydroxide, and mixtures thereof. Moreover, a variety of fatty acids can be used to treat the lecithin, including fatty acids, such as oleic acid, linoleic acid, palmitic acid, stearic acid, and mixtures thereof. In addition, monoglycerides and diglycerides can also be used to treat the lecithin.

Also in accordance with the present invention is a method of preparing a food item with a cookware release composition. A cookware release agent having lecithin treated with an alkali and a fatty acid at the same time, a fractionated oil, and a propellant are provided. The release agent and the fractionated oil are mixed to form the cookware release composition. The mixture is then dispensed from the aerosol container with the propellant onto the cookware surface. A food item is applied onto the coated cookware surface and heated.

DESCRIPTION OF THE DRAWINGS

FIG. 1 shows the lightness of heated cookware release compositions containing treated and untreated lecithin.

FIG. 2 shows the tilt angle at which food overcomes static friction on treated and untreated pans.

DETAILED DESCRIPTION

In the following description, reference is made to specific embodiments in which the invention may be practiced. It is to be understood that other embodiments may be utilized as changes may be made without departing from the scope of the present invention.

One embodiment of the present invention provides a cookware release composition including a release agent having a substantially anhydrous lecithin treated with an alkali and a fatty acid, an oil, such as a fractionated oil, and a propellant. A mixture of the treated lecithin and the oil is dispensed from an aerosol container by the propellant onto, for example, cookware surfaces or utensils. The composition provides a non-stick or low friction surface so that food items can be cooked on and easily removed from a surface coated with the composition. Further, when the treated lecithin is heated at typical cooking temperatures and durations, the composition exhibits less heat-induced lecithin browning compared to conventional compositions having non-treated lecithin or lecithin treated in other less effective manners, while providing a non-stick or low friction surface. Thus, the cooked food item is not discolored and can be removed from the cooking surface without damaging the food item.

Persons of ordinary skill in the art will recognize that the present invention can be used with different cooking temperatures and durations, food items and baking, frying, and cooking needs. For example, the composition of the present invention can also be applied to cookware that is used to bake food items in an oven at about 350° F. to about 450° F. for about 10 to about 60 minutes. The composition of the present invention is also suitable to be applied to cookware, such as a frying pan or skillet, that is used to prepare food items (such as eggs or pancakes) at similar temperatures for about 5 to about 10 minutes. Cooking surfaces or utensils in both cooking examples can be coated with the composition of the present invention to reduce or eliminate browning of lecithin at typical cooking temperatures and durations. Of course, the composition of the present invention can be used with various cooking temperatures and durations and with various cookwares, and the above examples are illustrative of various cooking applications.

Various cookware release agents can also be utilized with the present invention. Exemplary cookware release agents include substantially anhydrous phospholipids, such as substantially anhydrous forms of phosphorus-containing glycerides, including lecithin, lyso-phospholipids, and mixtures thereof. Preferably, the cookware release agent includes treated lecithin as an anti-stick or release agent.

The cookware composition of the present invention can contain various amounts of lecithin, e.g., from about 0.5% to about 50% by weight lecithin. Preferably, the cookware composition includes from about 1% to about 40% by weight lecithin, and most preferably, 3% to about 12%. Exemplary sources of lecithin that are suitable for the composition include both plant and animal sources, or a mixture thereof. For example, soybeans, corn germ, rice bran, cottonseeds, sunflower seeds, rapeseeds, canola, and egg yolks are all suitable sources of lecithin for the sprayable composition of the present invention. The lecithin may further be chemically-modified by, e.g., hydroxylation and acylation. Mixtures of naturally occurring lecithin and chemically-processed lecithins, such as hydroxylated lecithin and acylated lecithin, can also be utilized. Persons of ordinary skill in the art will recognize that other cookware release agents can also be used, for example substantially anhydrous forms of a lyso-phospholipid, a fractionated lecithin or phospholipid, a hydrogenated lecithin, or a mixture thereof.

Further, different types and combinations of oils, such as canola, corn, olive, and mixtures thereof, can be utilized.

Preferably, the oil is a fractionated oil, such as fractionated palm oil. Fractionated palm oil is discussed in further detail for purposes of explanation, but the invention is not so limited. The fractionated palm oil is at a temperature or has an amount of organic solvents so that it is free or substantially free of crystals or crystal-like structures so that the composition can be readily dispensed from an aerosol container. Fractionated palm oil is distinguished from whole palm oil since whole palm oil contains crystals or crystal-like structures that can clog a nozzle of an aerosol container. Accordingly, fractionated palm oil is preferred since it is liquid and is free or substantially free of crystals or crystal-like structures, thereby making it suitable to be dispensed from an aerosol container.

In one embodiment, the cookware composition includes from about 65% to about 80% fractionated palm oil by weight, more preferably, about 77.5%. The fractionated palm oil preferably is not transesterified or is a composition having a fractionated palm oil that does not polymerize at typical cooking temperatures and durations. One exemplary fractionated palm oil that can be utilized is a double fractionated palm oil, such as palm super olein. Other suitable fractionated palm oils, include but are not limited to, palm olein, fractionated palm kernel oil, and a mixture of palm olein and double fractionated palm oils such as palm super olein. For example, a preferred fractionated palm oil includes 41% palmitic acid, about 40% oleic acid, and 12% linoleic acid, by weight. The fractionated palm oil can also be a double fractionated palm oil and includes about 33% palmitic acid, 47% oleic acid, and about 13% linoleic acid, by weight. Indeed, various other fractionated oil compositions, such as fractionated palm kernel and coconut oils, can also be utilized.

One exemplary manner of preparing treated lecithin according to the present invention involves dissolving either dry or aqueous concentrated sodium hydroxide (up to 73% by weight) into 190 to 200 proof ethanol to a final concentration of about 0.4% by weight. The sodium hydroxide ethanol solution is mixed into substantially anhydrous lecithin or edible oil containing 2% to 12% by weight of substantially anhydrous lecithin to form a first mixture. The first mixture is combined with a free fatty acid to form a second mixture, and the second mixture is agitated to form a homogenous solution. Alternatively, the free fatty acid can be combined with the substantially anhydrous lecithin or oil before adding the sodium hydroxide and ethanol mixture.

The propellant of the sprayable composition can be a food grade propellant, such as a pressurized gas, a liquefied hydrocarbon, or a mixture thereof. For example, a pressurized gas propellant can be used so that about 2% to about 8.5% by weight, more preferably from about 3% to about 5%, of the liquid components of the composition is a pressurized gas. If a liquefied hydrocarbon propellant is utilized, the composition can include from about 10% to about 75% by weight liquefied hydrocarbon. Other suitable food grade propellants include nitrous oxide, carbon dioxide, nitrogen, propane, butane, or isobutene. For example, the cookware release composition can include about 2% to about 8.5% by weight, preferably about 3% to about 5%, of nitrous oxide. Additional exemplary propellants include mixtures of nitrous oxide and minor portions of other food grade propellants. Persons of ordinary skill in the art will appreciate that other propellants can also be utilized, including but not limited to, nitrous oxide, carbon dioxide, nitrogen, propane, butane, an isobutene propellant, or a mixture thereof.

Having described the components of embodiments of the present invention, FIGS. 1 and 2 illustrate how the composition of the present invention is advantageous relative to compositions containing untreated lecithin or lecithin treated with only sodium hydroxide. Specifically, FIG. 1 shows that, upon heating at typical cooking temperatures and durations, compositions containing lecithin treated with sodium hydroxide and a free fatty acid are more transmissive compared to compositions containing untreated lecithin and exhibit less heat-induced browning. Further, FIG. 2 shows that compositions containing lecithin treated with sodium hydroxide and free fatty acid according to the present invention have enhanced anti-stick or release characteristics than lecithin treated with only sodium hydroxide.

Tests 1 and 2, the results of which are summarized in FIGS. 1 and 2 respectively, both involve three cookware release compositions, each containing a different form of lecithin. The first composition is representative of a conventional composition containing untreated lecithin. The second is also representative of a conventional composition containing lecithin treated with only sodium hydroxide. The third composition contains lecithin treated with sodium hydroxide and free fatty acid according to the present invention. All three compositions contain 5% by volume of the respective lecithins in 80% fractionated palm oil and 10% ethanol. They were all baked for 4 minutes at 425° F., then tested.

In Test 1, the L, or lightness, value of each composition was measured using a Hunterlab D25-9 calorimeter, from Hunter Associates Laboratory, Inc. (Reston, Va.). The results of Test 1 are summarized in FIG. 1, wherein the vertical axis of the graph records the L value. FIG. 1 shows that, upon heating at typical cooking temperatures and durations, compositions containing lecithin treated with sodium hydroxide and free fatty acid according to the present invention transmit about twice as much light as a conventional composition containing untreated lecithin. This test shows that compositions containing lecithin treated according to the present invention are more resistant to heat-induced browning than a conventional composition containing untreated lecithin, and at least as resistant to heat-induced browning as a conventional composition containing lecithin treated with only sodium hydroxide. Further benefits of the composition of the present invention over the two conventional compositions are shown in Test 2, as described below.

In Test 2, each composition was applied by spraying 0.5 g over the cooking surface of a 11 inch Ballarini pan. A large egg was placed on each pan and the pan was then placed in an oven set to medium high. The eggs were cooked on the pan in the oven for 4 minutes and then flipped over and cooked for another minute. The pan was then tilted until the egg started slide. The angle at which the egg overcame static friction and began to slide down the pan was recorded and summarized in FIG. 2.

The vertical axis of the graph in FIG. 2 represents the angle at which a food item overcame static friction and began to slide down the cookie sheet. FIG. 2 shows that, upon heating at typical cooking temperatures and durations, cooking surfaces coated with a conventional composition containing lecithin treated with only sodium hydroxide have exhibited more static friction than cooking surfaces coated with a conventional composition containing untreated lecithin and a composition with lecithin treated with sodium hydroxide and free fatty acid according to the present invention. Therefore, this test shows that the anti-sticking abilities of the conventional composition containing lecithin treated with only sodium hydroxide is impaired relative to the composition of the present invention containing lecithin treated with an alkali and a fatty acid. This test also shows that compositions containing lecithin treated according to the present invention have about the same anti-stick ability as compositions containing untreated lecithin.

The test results summarized by FIGS. 1 and 2 indicate a number of advantages of the compositions of the present invention compared to conventional cooking sprays. First, the test results show that the compositions of the present invention are resistant to heat-induced browning and exhibit improved anti-stick characteristics compared to the conventional composition, having lecithin treated with only sodium hydroxide. Second, the test results show that the compositions of the present invention are more resistant to heat-induced browning compared to the conventional composition containing untreated lecithin, and exhibit improved or similar anti-stick characteristics compared to untreated lecithin.

The manner of manufacturing a product including a composition according to the present invention is now described. A treated lecithin release agent is mixed with the fractionated palm oil component until a uniform solution is obtained. Soluble optional components, such as antioxidants, can be added separately at this point, or previously introduced into one or both of the other components. Optional materials, which are not soluble in the resultant solution, such as the previously mentioned blocking agents, can be added and agitated to form a uniform dispersion. The container is filled with the resulting blend, and a vacuum is drawn to purge air from the container. Alternatively, the propellant can be used to purge air from the headspace of the container. A suitable aerosol valve is then inserted and crimped into place, creating an air tight pressure seal. Suitable valve components are available from Seaquist Perfect Dispensing (Cary, Ill.). Nitrous oxide is injected into the container. Hydrocarbon propellants can also be used in the manner described previously, or by using under the cup gassing. Also useful in the practice of the present invention are thin-walled aerosol containers, such as containers available from Dispensing Container Corporation (DCC) (Allentown, Pa.). The "head space" or space within the aerosol container occupied by the propellant is measured relative to conventional containers so as to occupy from about 15% to about 60% of the volume of the container (when full).

With the previously described composition and container, the sprayable cookware release composition can be uniformly and effectively applied to surfaces of utensils, molds, frying pans, sauce pans, baking pans or other cooking surfaces, whether composed of metal, glass or ceramic materials. The thin coating film better permits the cooking of food items such as eggs, pancakes, muffins, cookies, and various other food items without the need to apply additional grease or fat to provide a non-stick surface. After cooking, these food items will be released from the surface with little or no removal effort. The cookware can be cleaned easily without significant scrubbing, brushing, or scouring using water with or without detergent. Preferably, the composition should be applied each time the cooking surface is utilized, however, the coating can last for multiple cooking occasions without reapplication.

The cookware release composition can optionally include various other ingredients and additives. As previously discussed, one optional ingredient is a non-fractionated oil. The non-fractionated oil is mixed with the release agent and the fractionated palm oil, and the mixture is dispensed by the propellant from the aerosol container. Exemplary non-fractionated oils that can be utilized include, but are not limited to, soybean oil, sunflower oil, winterized cottonseed oil, corn oil, safflower oil, peanut oil, walnut oil, grape-seed oil, olive oil, or canola oil. Mixtures of the fractionated palm oil and the non-fractionated oils can also be used.

The composition can also optionally include various food-grade additives, including but not limited to, anti-foaming agents, blocking agents, flavoring agents, preservatives, antioxidants, emulsifying agents, coloring agents, crystallization inhibiting agent, and viscosity reducing agents. For example, food grade blocking agents, which are visually directing aids and include grain and bean flours, starches, protein powder, and calcium gypsum. Such blocking agents allow the discharge spray to be more readily seen, thereby enabling the user to better direct such discharged spray in the practice of the present invention. Useful preservatives include sodium benzoate, calcium propionate, sorbic acid or salts of sorbic acid such as sodium sorbate and potassium sorbate. Preferred are sodium benzoate in an amount of from about 0.05% to about 0.1% by weight and calcium propionate in an amount of from about 0.1% to about 0.3% on the same basis. Antioxidants, may naturally occurring such as tocopherols or synthetic such as TBHQ, (which act to prevent rancidity of lipid components). Exemplary food-grade emulsifying agents that can be utilized include a monoglyceride, a diglyceride, or a combination thereof. The composition dispensed from the container can also include a crystalization inhibiting agent, such as a polyglycerol ester.

Additional optional ingredients or components include a solvent to decrease the viscosity of the lecithin/vegetable oil mixture found in the claimed composition. Preferred is the use of ethyl alcohol. Also, a hydrocarbon with a vapor pressure of between 15 and 108 PSIG may be used. Ethyl alcohol is discussed in further detail for purposes of explanation.

An exemplary ethyl alcohol that can be utilized is between about 190° and 200° proof, which conforms with United States Pharmacopoeia (U.S.P.) standards for Alcohol and Dehydrated Alcohol, respectively. The 190° proof to 200° proof ethanols are available from various sources, for instance, from U.S. Grain Processing Corp. (Muscatine, Iowa) Ethanol of 200 U.S. proof degrees at 60° F. has a specific gravity of 0.79365, is 100 percent by weight of ethyl alcohol. Ethanol of 190 U.S. proof degrees at 60° F. has a specific gravity of 0.81582, is 92.423 percent by weight of alcohol and contains 7.577 percent by weight of water. The 190° proof ethanol may be made by mixing 95 parts by volume of ethyl alcohol with 6.18 parts by volume of water. As used in the present invention, the ethyl alcohol functions as both a viscosity-lowering solvent and a clarifying agent.

In addition to the use of ethyl alcohol, ethyl alcohol denatured with a GRAS-classified food grade denaturant, such as S.D.A. 29-3, can be used in the practice of the present invention. S.D.A. 29-3 contains 99% ethyl alcohol and 1% ethyl acetate as a denaturant. Ethyl acetate is a GRAS denaturant thereby allowing the use of S.D.A. 29-3 in a food grade product such as the claimed composition.

The ethyl alcohol component may be present in amounts ranging from 0 to about 25% by weight, based upon the total weight of the liquid components. Preferably, it is present in amounts ranging from about 5 to about 20%.

A food item can be prepared with the method described below using the cookware release composition according to the present invention. Initially, a cookware release agent, an oil, and a propellant are provided. The cookware release agent and the oil are mixed together to form the cookware release composition. The mixture is then dispensed from the aerosol container with the propellant onto, for example, a cookware surface or mold. The food item is applied onto the coated cookware surface, and the coated cookware surface and the food item are heated to typical cooking temperatures for typical cooking durations, as previously described. Of course, persons of ordinary skill in the art will recognize that the previously recited steps can be performed in different orders. For example, the food item can be applied to the cooking surface, and then the composition can be applied to the cooking surface (and food item) and then heated.

Although references have been made in the foregoing description to various embodiments, persons of ordinary skill in the art of sprayable cooking compositions will recognize that insubstantial modifications, alterations, and substitutions can be made to the described embodiments without departing from the invention as claimed in the accompanying claims, particularly considering that a sprayable composition with a treated lecithin can include various other ingredients, and the composition can be used with many different cookware surfaces and food items. For example, various types of bases and fatty acids can be utilized to treat lecithin and other cookware release agents in a composition according to the present invention.

What is claimed is:

1. A cookware release composition suitable for dispensing from an aerosol container, comprising:
    a cookware release agent having lecithin, the lecithin being treated with an alkali and a fatty acid at the same time;
    an oil; and
    a propellant,
    wherein a mixture of said cookware release agent having said treated lecithin and said oil is dispensed from the aerosol container by said propellant.

2. The cookware release agent of claim 1, wherein said lecithin is treated with a mixture of said alkali and said fatty acid.

3. The cookware release agent of claim 1, wherein said lecithin comprises a substantially anhydrous lecithin.

4. The cookware release agent of claim 3, wherein said substantially anhydrous lecithin includes about 1.0% to about 1.8% water by weight.

5. The cookware release composition of claim 1, wherein the composition includes about 0.5% to about 50% of said treated lecithin by weight.

6. The cookware release composition of claim 1, wherein said alkali comprises sodium sorbate.

7. The cookware release composition of claim 1, wherein said alkali comprises potassium sorbate.

8. The cookware release composition of claim 1, wherein said alkali comprises sodium carbonate.

9. The cookware release composition of claim 1, wherein said alkali comprises potassium carbonate.

10. The cookware release composition of claim 1, wherein said alkali comprises sodium bicarbonate.

11. The cookware release composition of claim 1, wherein said alkali comprises potassium bicarbonate.

12. The cookware release composition of claim 1, wherein said alkali comprises sodium acetate.

13. The cookware release composition of claim 1, wherein said alkali comprises potassium acetate.

14. The cookware release composition of claim 1, wherein said alkali comprises sodium hydroxide.

15. The cookware release composition of claim 14, wherein said lecithin is treated with sodium hydroxide at a concentration of about 0.5% to about 2.5% based on the weight of said lecithin.

16. The cookware release composition of claim 1, wherein said alkali comprises potassium hydroxide.

17. The cookware release composition of claim 16, wherein said lecithin is treated with potassium hydroxide at a concentration of about 0.7% to about 3.5% based on the weight of said lecithin.

18. The cookware release composition of claim 1, further comprising a second alkali wherein said lecithin is treated with said second alkali.

19. The cookware release composition of claim 18, wherein said lecithin is treated with said fatty acid, said first alkali, and said second alkali at the same time.

20. The cookware release composition of claim 1, wherein said fatty acid comprises oleic acid.

21. The cookware release composition of claim 20, wherein said lecithin is treated with oleic acid at a concentration of about 0.1% to about 0.5% based on the weight of the composition.

22. The cookware release composition of claim 1, wherein said fatty acid comprises linoleic acid.

23. The cookware release composition of claim 22, wherein said lecithin is treated with linoleic acid at a concentration of about 0.1% to about 0.5% based on the weight of the composition.

24. The cookware release composition of claim 1, wherein said fatty acid comprises palmitic acid.

25. The cookware release composition of claim 24, wherein said lecithin is treated with palmitic acid at a concentration of about 0.1% to about 0.5% based on the weight of the composition.

26. The cookware release composition of claim 1, wherein said fatty acid comprises stearic acid.

27. The cookware release composition of claim 26, wherein said lecithin is treated with stearic acid at a concentration of about 0.1% to about 0.5% based on the weight of the composition.

28. The cookware release composition of claim 1, further comprising a second fatty acid, wherein said lecithin is treated with said second fatty acid at the same time.

29. The cookware release composition of claim 28, wherein said lecithin is treated with said alkali, said first fatty acid, and said second fatty acid at the same time.

30. The cookware release composition of claim 1, wherein said fatty acid comprises a free fatty acid.

31. The cookware release composition of claim 1, wherein said fatty acid comprises a plant fatty acid.

32. The cookware release composition of claim 1, wherein said fatty acid comprises an animal fatty acid.

33. The cookware release composition of claim 1, wherein said fatty acid is derived from a soybean oil, a canola oil, a sunflower oil, a corn oil, a coconut oil, a palm oil, or mixtures thereof.

34. The cookware release composition of claim 1, wherein said fatty acid comprises an oil free fatty acid.

35. The cookware release composition of claim 1, wherein the composition comprises:

about 76% of said oil;

about 5% of said treated lecithin; and about 5% of said propellant, wherein the percentages are based on a weight of the composition.

36. The cookware release composition of claim 1, further comprising ethanol, said lecithin being treated with a mixture having:

about 87 to about 97% ethanol;

about 0.4% of an alkali; and about 1% of a fatty acid, wherein the percentages are based on a weight of the mixture.

37. A cookware release composition suitable for dispensing from an aerosol container, comprising:

a cookware release agent having lecithin treated with an alkali and a monoglyceride at the same time;

an oil; and a propellant, wherein a mixture of said cookware release agent having said treated lecithin and said oil is dispensed from the aerosol container by said propellant.

38. A cookware release composition suitable for dispensing from an aerosol container, comprising:

a cookware release agent having lecithin treated with an alkali and a diglyceride at the same time;

an oil; and a propellant, wherein a mixture of said cookware release agent having said treated lecithin and said oil is dispensed from the aerosol container by said propellant.

* * * * *